US012595692B2

(12) United States Patent
Kim et al.

(10) Patent No.: US 12,595,692 B2
(45) Date of Patent: Apr. 7, 2026

(54) AUTO FLUSH DOOR HANDLE ASSEMBLY

(71) Applicants: HYUNDAI MOTOR COMPANY, Seoul (KR); KIA CORPORATION, Seoul (KR)

(72) Inventors: Jun-Tae Kim, Yongin-si (KR); Jung-Ho Han, Seoul (KR); Han-Gi Son, Hwaseong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 175 days.

(21) Appl. No.: 18/520,832

(22) Filed: Nov. 28, 2023

(65) Prior Publication Data

US 2025/0020003 A1 Jan. 16, 2025

(30) Foreign Application Priority Data

Jul. 11, 2023 (KR) ........................ 10-2023-0089804

(51) Int. Cl.
*E05B 85/10* (2014.01)
*E05B 85/18* (2014.01)
*E05B 85/14* (2014.01)

(52) U.S. Cl.
CPC ............ *E05B 85/103* (2013.01); *E05B 85/18* (2013.01)

(58) Field of Classification Search
CPC ..... E05B 85/103; E05B 85/107; Y10S 292/31
See application file for complete search history.

(56) References Cited

U.S. PATENT DOCUMENTS

| | | | | |
|---|---|---|---|---|
| 2,237,949 | A * | 4/1941 | Palmer | E05B 85/14 292/DIG. 31 |
| 6,698,262 | B2 * | 3/2004 | Wittwer | E05B 77/34 292/DIG. 31 |
| 9,458,649 | B2 * | 10/2016 | Fujiwara | E05B 81/56 |
| 10,167,656 | B2 * | 1/2019 | Park | E05B 81/42 |
| 10,174,528 | B2 * | 1/2019 | Velicanin | E05B 85/10 |
| 10,253,533 | B1 * | 4/2019 | Pudney | E05F 1/1016 |
| 11,499,352 | B2 | 11/2022 | Guerin | |
| 11,607,932 | B2 | 3/2023 | Couto Maquieira et al. | |
| 11,649,659 | B2 * | 5/2023 | Chen | E05B 85/103 292/336.3 |

(Continued)

FOREIGN PATENT DOCUMENTS

| | | | | |
|---|---|---|---|---|
| CN | 114776153 | A * | 7/2022 | E05B 79/22 |
| EP | 0198766 | A1 * | 10/1986 | E05B 85/18 |

(Continued)

*Primary Examiner* — Carlos Lugo
(74) *Attorney, Agent, or Firm* — Lempia Summerfield Katz LLC

(57) ABSTRACT

An auto flush door handle assembly includes a housing with an opening formed on one side of the housing, and a handle cover disposed inside the housing. In particular, the handle cover opens or closes the opening. The flush door handle assembly further includes a first rotation link having an upper end link-connected to the housing and a lower end link-connected to the handle cover, and a second rotation link positioned apart from the first rotation link and having an upper end link-connected to the housing and a lower end link-connected to the handle cover. The flush door handle assembly includes a release link operated by the first rotation link and configured to release a door latch.

19 Claims, 11 Drawing Sheets

(56) References Cited

U.S. PATENT DOCUMENTS

| | | | | |
|---|---|---|---|---|
| 11,851,920 | B2 * | 12/2023 | Peterson | E05B 81/06 |
| 2014/0000167 | A1 * | 1/2014 | Patel | E05B 85/103<br>49/32 |
| 2019/0234121 | A1 * | 8/2019 | Pudney | E05B 85/103 |
| 2020/0087956 | A1 | 3/2020 | Guerin | |
| 2020/0199918 | A1 | 6/2020 | Couto Maquieira et al. | |
| 2023/0258029 | A1 * | 8/2023 | Philippe | E05B 85/103<br>70/277 |
| 2023/0340810 | A1 * | 10/2023 | Rudolf | E05B 85/107 |
| 2024/0392616 | A1 * | 11/2024 | Yu | E05B 85/103 |
| 2024/0392621 | A1 * | 11/2024 | Kim | E05B 85/107 |

FOREIGN PATENT DOCUMENTS

| | | | | | |
|---|---|---|---|---|---|
| EP | 3620599 | A1 | | 3/2020 | |
| FR | 2857684 | A1 | * | 1/2005 | E05B 77/06 |
| JP | 2019027076 | A | * | 2/2019 | |
| JP | 2020084457 | A | | 6/2020 | |
| KR | 20090064667 | A | * | 6/2009 | E05B 1/04 |
| KR | 20210055107 | A | | 5/2021 | |
| KR | 102525410 | B1 | | 4/2023 | |

* cited by examiner

AUTO FLUSH DOOR HANDLE ASSEMBLY

CROSS-REFERENCE(S) TO RELATED APPLICATIONS

This application claims priority to Korean Patent Application No. 10-2023-0089804, filed on Jul. 11, 2023, the disclosure of which is incorporated herein by reference in its entirety.

BACKGROUND

Field

Embodiments of the present disclosure relate to an auto flush door handle assembly for automatically opening and closing a vehicle door, and more particularly, to a horizontal storage type auto flush door handle assembly in which a handle cover is moved horizontally to be accommodated in the assembly and which allows a user to easily recognize an operation method even in an emergency.

Description of Related Art

Recently, a specific door handle, designed to be flush with the door's surface when not in use (namely, an auto flush type door handle), has been used in doors, which can be convenient for both aesthetics and safety. As illustrated in FIGS. 1, 2A and 2B, such an auto flush type door handle 102 for opening and closing a door 101 is mounted on the door 101 of a vehicle 100.

A user operates the door handle 102 and unlocks a door latch to open the door 101.

As illustrated in FIGS. 1, 2A and 2B, a surface of the door handle 102 is positioned coplanar with an outer surface of the door 101 during traveling (see FIG. 2A), and when the door latch (not shown) is unlocked by a remote control key, e.g., a smart key, the door handle 102 protrudes from the surface of the door 101 (see FIG. 2B). Since the door latch is locked during traveling, the auto flush type door handle 102 does not protrude from the outer surface of the door 101 so that air resistance of the vehicle 100 is reduced to improve aerodynamic performance. In addition, an aesthetic sense of an exterior of the vehicle 100 is improved.

The auto flush type door handle 102 is operated by an actuator (not shown) inside the door 101 and components which are operated by the actuator.

Since the entirety of the auto flush type door handle 102 protrudes from the door 101 by a predetermined height, in addition to the actuator, components provided between the actuator and the door handle 102 are operated only in a sliding manner so that there is a problem in that a handle structure is complicated.

In addition, the auto flush type door handle 102 is operated by applying electric power thereto, when a battery of the vehicle is discharged, the power for operating the actuator is not supplied so that the actuator cannot be operated and therefore it is not easy for a user to operate the door handle 102. Since the auto flush type door handle 102 employs a manually opened configuration different from the conventional door handle, there is a problem in that, when the user does not recognize or is not familiar with an opening/closing method, the door handle 102 cannot be opened by the user even in an emergency.

In addition, since the door 101 may not be opened by operating the door handle 102 from the outside in the event of a vehicle collision or fire, there is a problem in that a rescue operation of an occupant in the compartment of the vehicle is delayed, leading to a fatal accident.

The statements in this section merely provide background information related to the present disclosure and may not constitute prior art.

SUMMARY

An embodiment of the present disclosure is directed to providing a horizontal storage type auto flush door handle assembly in which a handle cover is accommodated horizontally in a housing of the assembly so that a user may easily recognize an operating method of a door handle and which may be easily operated in an emergency or even when a battery is discharged.

Other objects and advantages of the present disclosure can be understood by the following description and become apparent with reference to the embodiments of the present disclosure. Also, it is obvious to those having ordinary skill in the art to which the present disclosure pertains that the objects and advantages of the present disclosure can be realized by the means as claimed and combinations thereof.

In accordance with an embodiment of the present disclosure, a horizontal storage type auto flush door handle assembly includes: a housing with an opening formed on one side thereof, a handle cover disposed inside the housing and configured to open and close the opening, and a first rotation link having an upper end link-connected to the housing and a lower end link-connected to the handle cover. The horizontal storage type auto flush door handle assembly further includes: a second rotation link positioned apart from the first rotation link and having an upper end link-connected to the housing and a lower end link-connected to the handle cover, and a release link operated by the first rotation link and configured to release a door latch.

An operating protrusion may be formed on one side of the first rotation link, and the operating protrusion is moved up according to a rotation of the first rotation link and operates the release link while being moved up.

The release link may be rotatably installed on one side of the housing, and when the operating protrusion is moved up, a contact surface in contact with the operating protrusion may be formed, a latch connecting hole connected to the door latch may be formed, and when the operating protrusion being moved up pushes the contact surface to rotate the release link, the door latch may be released.

A guide slot may be formed on a side surface of the housing along a trajectory of the operating protrusion, and the operating protrusion passes through the guide slot.

The second rotation link may be link-connected to the housing and the handle cover to be higher than the first rotation link by a predetermined height.

A second link shaft configured to link-connect an upper end of the second rotation link to the housing may be positioned directly above a first link shaft configured to link-connect an upper end of the first rotation link to the housing, and a fourth link shaft configured to link-connect a lower end of the second rotation link to the handle cover may be positioned directly above a third link shaft configured to link-connect a lower end of the first rotation link to the handle cover.

When the first rotation link and the second rotation link are rotated, the handle cover may maintain a state in which the fourth link shaft is positioned directly above the third link shaft.

When the handle cover closes the opening, the third link shaft and the fourth link shaft may be positioned on an outer side of a vehicle than the first link shaft and the second link shaft.

The horizontal storage type auto flush door handle assembly may further include an actuator configured to operate the first rotation link.

The horizontal storage type auto flush door handle assembly may further include an operating link rotated by the actuator to rotate the first rotation link between the actuator and the first rotation link.

When the operating link is operated by the actuator, the operating protrusion may be moved up.

A rod may be installed on the actuator to be movable in a straight line, and when the rod extends and rotates the operating link, the operating link may move the operating protrusion upward, and the operating protrusion may rotate the release link.

An input portion in contact with the rod may be formed at a lower end of the operating link, and an operating portion configured to rotate the operating protrusion may be formed at an upper end of the operating link.

The first rotation link and the second rotation link may be formed to be concave inward the vehicle.

A release switch, which is manipulated by a user to open the door when the handle cover is accommodated inside the housing, may be installed.

DETAILED DESCRIPTION

Figure 1:
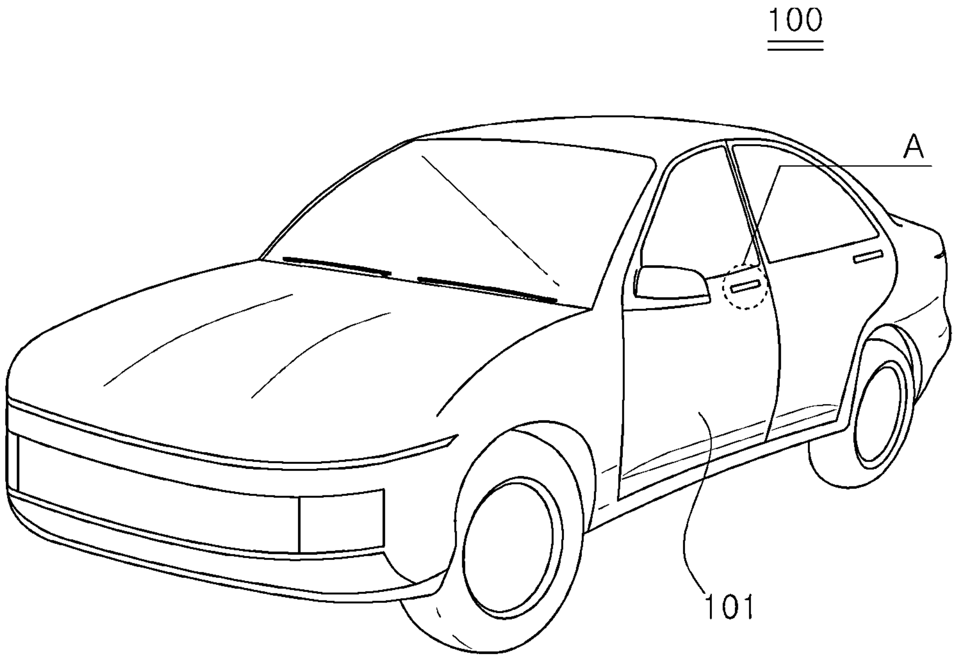
FIG. 1 (Prior Art)
FIG. 1 is a schematic diagram illustrating a state in which an auto flush door handle is mounted on a door of a vehicle in the related art.
Figure 2A:
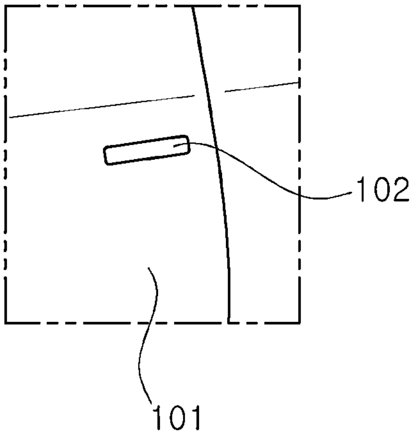
FIG. 2A (Prior Art)
FIG. 2A is a perspective view illustrating a state in which the door handle of FIG. 1 is accommodated in the door.
Figure 2B:
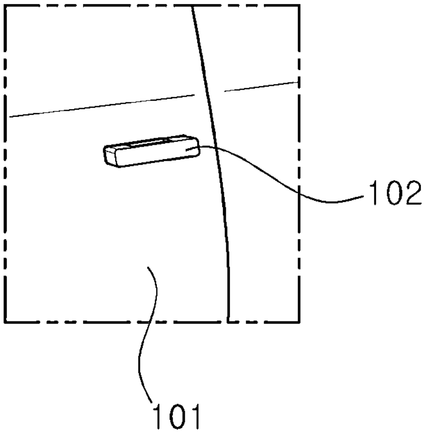
FIG. 2B (Prior Art)
FIG. 2B is a perspective view illustrating a state in which the door handle of FIG. 1 protrudes from the door.

Hereinafter, a horizontal storage type auto flush door handle assembly according to the present disclosure is described in detail with reference to the accompanying drawings.

In an embodiment of the present disclosure, a horizontal storage type auto flush door handle assembly 10 may include a housing 11 with an opening 11*a* formed on one side thereof, a handle cover 12 disposed inside the housing 11 and configured to open and close the opening 11*a*, and a first rotation link 14 having an upper end link-connected to the housing 11 and a lower end link-connected to the handle cover 12. The auto flush door handle assembly 10 further includes a second rotation link 15 positioned apart from the first rotation link 14 and having an upper end link-connected to the housing 11 and a lower end link-connected to the handle cover 12, and a release link 18 operated by the first rotation link 14 and configured to release a door latch (not shown).

When a component, device, element, or the like of the present disclosure is described as having a purpose or performing an operation, function, or the like, the component, device, or element should be considered herein as being "configured to" meet that purpose or to perform that operation or function.

The housing 11 may have a space formed therein and may be installed inside a door. A circumference of the opening 11*a* of the housing 11 may be inserted into and assembled with an opening (not shown) formed on an outer panel (not shown) of the door.

The handle cover 12, the first rotation link 14, and the second rotation link 15 may be installed inside the housing 11.

The handle cover 12 may be disposed inside the housing 11 and opens and closes the opening 11*a*. The handle cover 12 may close the opening 11*a* when the door handle assembly 10 is not operated and may open the opening 11*a* when the door handle assembly 10 is operated.

A circumference of the handle cover 12 may be formed in a shape corresponding to the circumference of the opening 11*a* to come into contact with the circumference of the opening 11*a*, thereby closing the opening 11*a*.

When the door handle assembly 10 is not operated, i.e., when the handle cover 12 closes the opening 11*a*, a surface of the handle cover 12 may align with or be in the same plane as a surface of the outer panel of the door. Thus, air resistance may be reduced during traveling and an aesthetic appearance of the vehicle is improved.

The first rotation link 14 may be disposed inside the housing 11 and may connect the housing 11 and the handle cover 12. The upper end of the first rotation link 14 may be link-connected to the housing 11 and the lower end thereof may be link-connected to the handle cover 12.

An operating protrusion 14*a* may be formed on a side surface of the first rotation link 14. In particular, the operating protrusion 14*a* protrudes from the first rotation link 14, passing-through the housing 11. Since the lower end of the first rotation link 14 is link-connected to the housing 11 that is fixed, when the first rotation link 14 is rotated, the operating protrusion 14*a* may be moved up.

The second rotation link 15 may be link-connected to the housing 11 and the handle cover 12 at a position apart from the first rotation link 14. An upper end of the second rotation link 15 may be also link-connected to the housing 11 and a lower end thereof may be also link-connected to the handle cover 12. Thus, the housing 11, the first rotation link 14, the second rotation link 15, and the handle cover 12 may form a four-joint link mechanism.

In one embodiment, the second rotation link 15 may be link-connected to the housing 11 and the handle cover 12 at a position that is higher than the first rotation link 14 by a predetermined distance. In other words, a second link shaft S2 link-connecting the upper end of the second rotation link 15 and the housing 11 may be positioned directly above a first link shaft S1 link-connecting the upper end of the first rotation link 14 and the housing 11. In addition, a fourth link shaft S4 link-connecting the lower end of the second rotation link 15 and the handle cover 12 may be positioned directly above a third link shaft S3 link-connecting the lower end of the first rotation link 14 and the handle cover 12.

A length of the first rotation link 14 (a distance between the first link shaft S1 and the third link shaft S3) may be equal to a length of the second rotation link 15 (a distance between the second link shaft S2 and the fourth link shaft S4), and a distance between the first link shaft S1 and the second link shaft S2 may be equal to a distance between the third link shaft S3 and the fourth link shaft S4.

Thus, the housing 11, the first rotation link 14, the second rotation link 15, and the handle cover 12 may constitute a four-joint link, forming the parallelogram shape.

Since the upper ends of the first rotation link 14 and the second rotation link 15 are link-connected to the housing 11, and the handle cover 12 may close the opening 11*a*, when the handle cover 12 closes the opening 11*a*, the third link shaft S3 and the fourth link shaft S4 may be positioned at outer sides of the vehicle than the first link shaft S1 and the second link shaft S2.

In addition, when operated, since only a position of the handle cover 12 is changed without a change in an attitude of the handle cover 12 and a rotation thereof, the handle cover 12 may be accommodated in a horizontal direction when moved from the opening 11*a* to an inside of the housing 11 (namely, a horizontal storage type auto flush door handle assembly). To this end, when the first rotation link 14 and the second rotation link 15 are rotated, the handle cover 12 may be maintained in a state in which the fourth link shaft S4 is positioned directly above the third link shaft S3.

The first rotation link 14 and the second rotation link 15 may be formed in a curved state inward the vehicle so as not to be caught on the handle cover 12 during rotation. In other words, because the first rotation link 14 and the second rotation link 15 are each formed in an "L" shape, and intermediate portions thereof may be formed concavely inward the vehicle, the first rotation link 14 and the second rotation link 15 may avoid interference with the handle cover 12 during rotation.

In an embodiment, an upper surface of the handle cover 12 also may have a partially incised shape so as not to be caught on the first rotation link 14 and the second rotation link 15.

The release link 18 may be rotatably installed on one side of the housing 11. The release link 18 may be rotatably installed at the housing 11 using a through-hole 18*a* formed in the release link 18. The release link 18 may be operated by the first rotation link 14 and operates a door latch (not shown) which restrains the door to a vehicle body.

The release link 18 may be hinge-coupled to one side of the housing 11 and may be rotatably installed thereon.

A contact surface 18*b* in contact with the operating protrusion 14*a* may be formed on one side of the release link 18, and when the operating protrusion 14*a* is moved up due to a rotation of the first rotation link 14, the release link 18 may be rotated by the operating protrusion 14*a*.

In the release link 18, a latch connecting hole 18*c* connected to the door latch may be formed on a side opposite to the contact surface 18*b*. The latch connecting hole 18*c* and the door latch may be connected by a link to operate the door latch to be released due to a rotation of the release link 18. When the release link 18 is rotated while the operating protrusion 14*a* is moved up, the door latch may be released due to the rotation of the release link 18.

An actuator 16 may operate the first rotation link 14. When an operation signal is input to the actuator 16, a rod 16*a* installed at the actuator 16 may be moved in a straight line to protrude from the actuator 16 or to be accommodated inside the actuator 16.

An operating link 17 may operate the first rotation link 14 by the actuator 16. The operating link 17 may be rotatably installed on an outer side of the housing 11 or the door through a rotation shaft 17*a* formed in the middle of the operating link 17, and a lower portion of the operating link 17 may be positioned adjacent to the rod 16*a*. Thus, when the rod 16*a* protrudes from the actuator 16, the lower portion of the operating link 17 may be pushed to rotate the operating link 17 around the rotation shaft 17*a*. When the operating link 17 is rotated, an upper end of the operating link 17 may push the operating protrusion 14*a* upward, and thus the first rotation link 14 may be rotated.

Meanwhile, an input portion 17*b* and an operating portion 17*c* may be formed to protrude from the operating link 17 at a lower end and the upper end of the operating link 17, respectively. Since the input portion 17*b* is positioned adjacent to an end portion of the rod 16*a*, when the rod 16*a* protrudes from the actuator 16, the rod 16*a* may push the input portion 17*b* to rotate the operating link 17. When the operating link 17 is rotated, the operating portion 17*c* may push and move the operating protrusion 14*a* upward.

In the present disclosure, in a steady state, the actuator 16 may operate to rotate the first rotation link 14 so that the handle cover 12 opens and closes the opening 11*a*.

However, in an emergency or when the battery is discharged, the handle cover 12, the first rotation link 14, and the second rotation link 15 may be operated without the operation of the actuator 16. The operating link 17 and the operating protrusion 14*a* may be not connected in a link manner, and the operating portion 17*c* may come into contact with the operating protrusion 14*a* only when the operating link 17 is rotated. Thus, the first rotation link 14 may be rotated due to the rotation of the operating link 17 to operate the handle cover 12 and the second rotation link 15. Alternatively, regardless of the operating link 17, the first rotation link 14 and the second rotation link 15 may be rotated while the handle cover 12 is operated.

An operation of the horizontal storage type auto flush door handle assembly according to the present disclosure, which has the above-described configuration, is described as follows.

Figure 3:
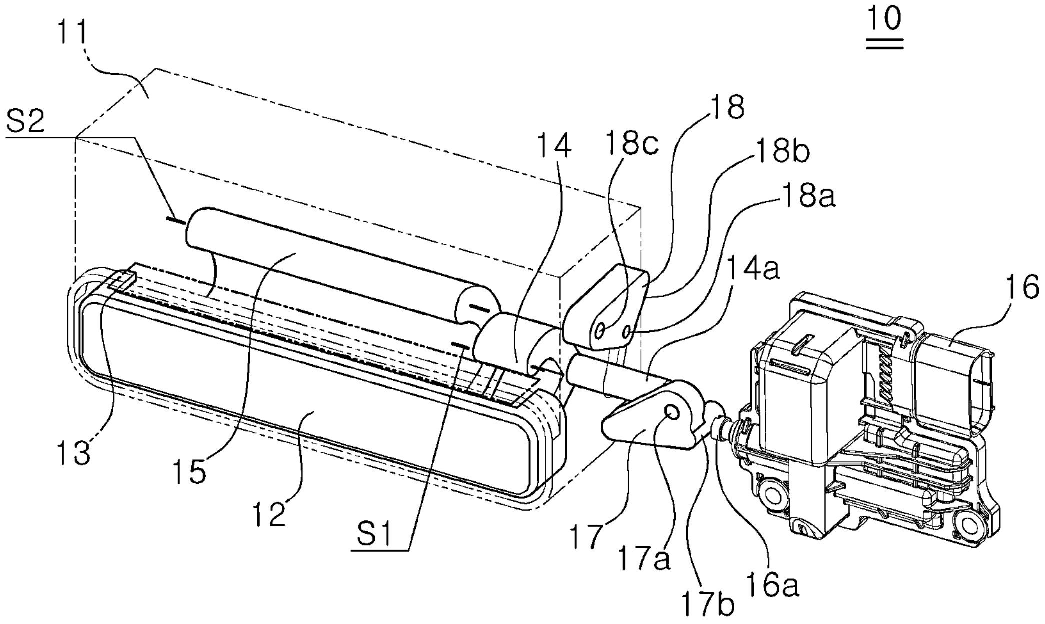
FIG. 3 is a perspective view illustrating a horizontal storage type auto flush door handle assembly according to an embodiment of the present disclosure.
Figure 4:
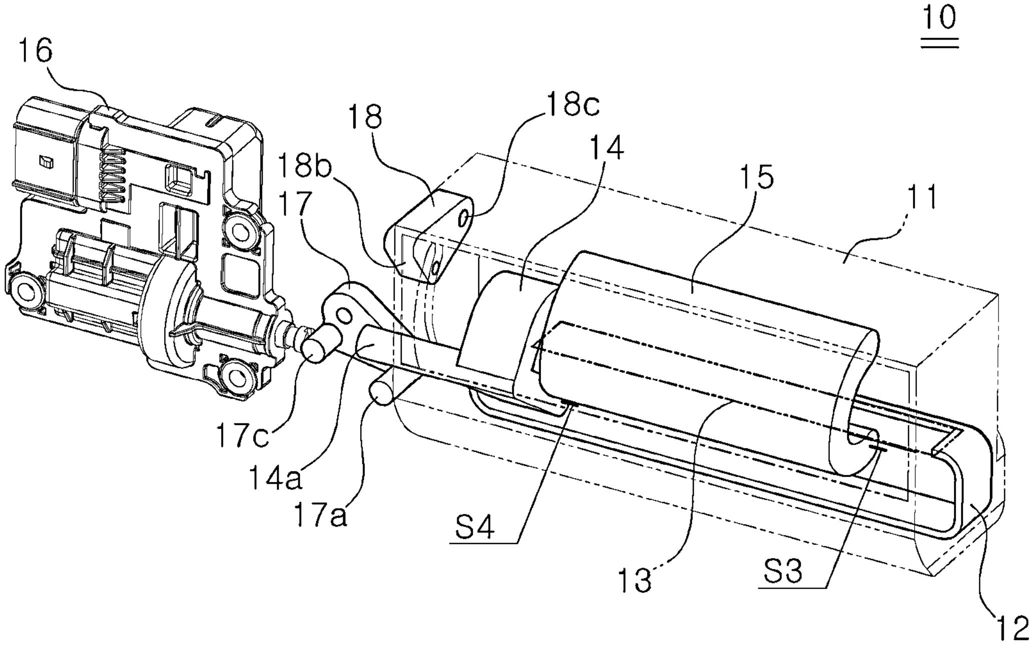
FIG. 4 is a rear perspective view illustrating the horizontal storage type auto flush door handle assembly according to the present disclosure.
Figure 5:
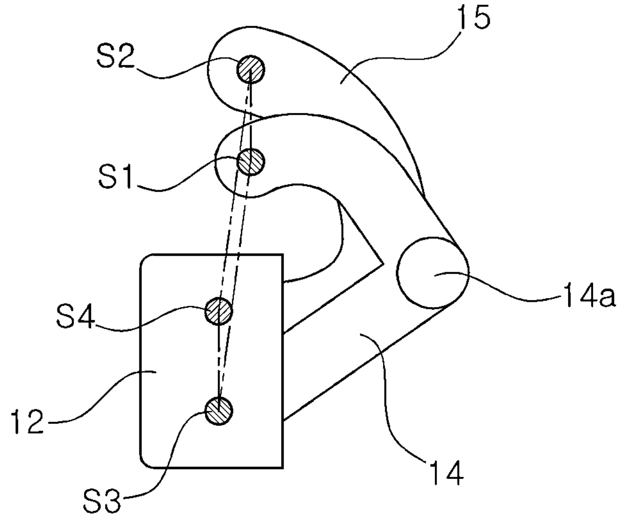
FIG. 5 is a side view illustrating a connection relationship between a handle cover and a rotation link in the horizontal storage type auto flush door handle assembly according to an embodiment of the present disclosure.
Figure 6:
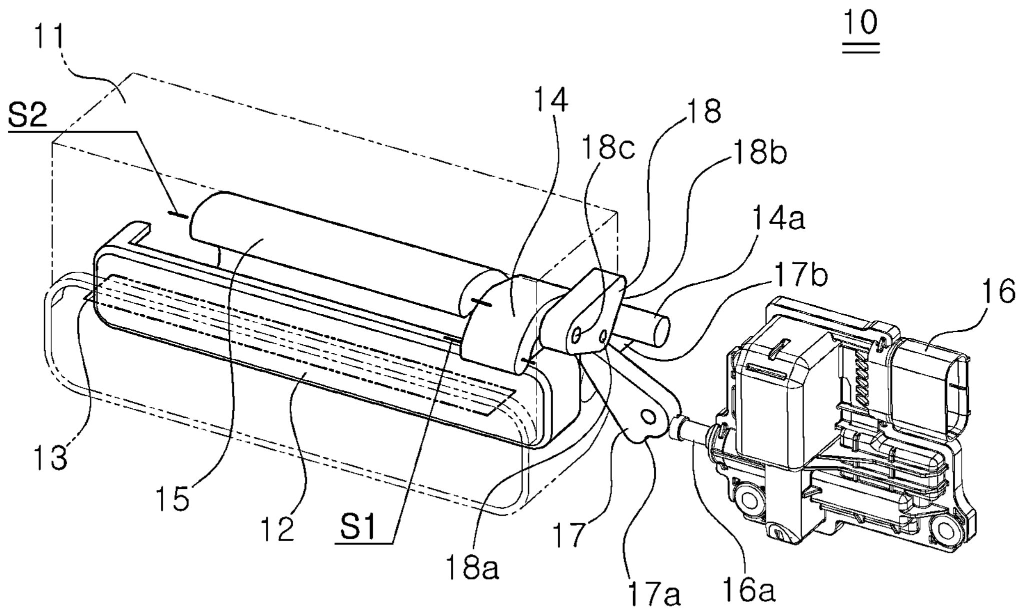
FIG. 6 is a perspective view illustrating a state in which the handle cover is accommodated in the horizontal storage type auto flush door handle assembly according to the present disclosure.

As shown in FIG. 3, in a state in which the door (not shown) is closed, the handle cover 12 closes the opening 11*a*. In addition, the surface of the handle cover 12 may form the same plane as the outer surface of the door so that there is no portion protruding or recessed from the door.

Figure 7:
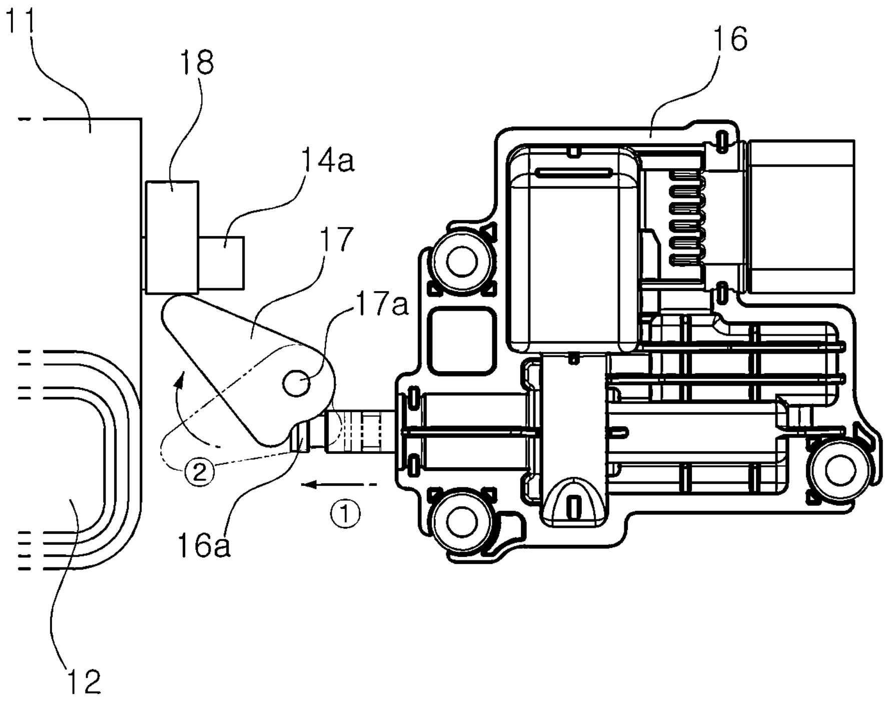
FIG. 7 is a front view illustrating a state in which an operating link and a release link are operated when an actuator is operated in the horizontal storage type auto flush door handle assembly according to an embodiment of the present disclosure.
Figure 8:
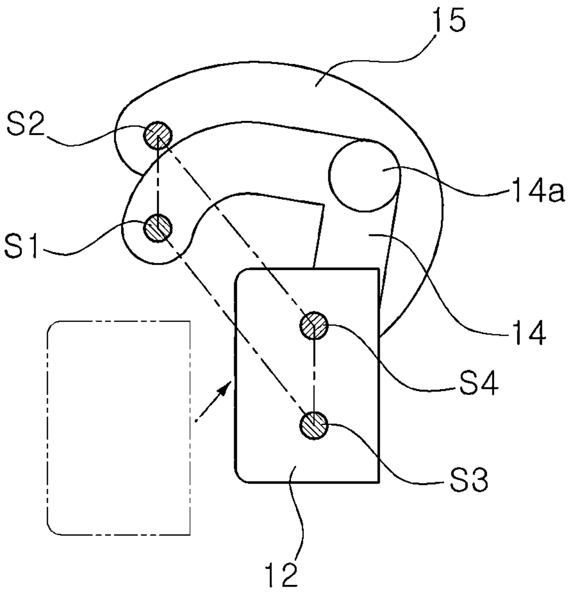
FIG. 8 is a side view illustrating a connection relationship between the handle cover and the rotation link when the handle cover is accommodated in the horizontal storage type auto flush door handle assembly according to an embodiment of the present disclosure.
Figure 9:
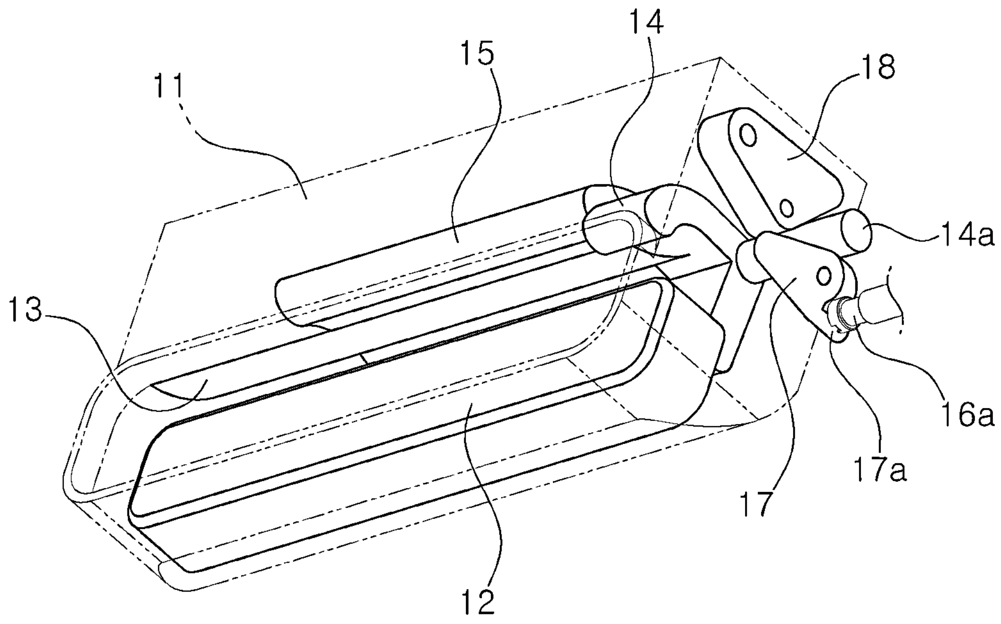
FIG. 9 is a bottom perspective view illustrating a state in which the handle cover is accommodated in the horizontal storage type auto flush door handle assembly according to an embodiment of the present disclosure.

In a steady state, when a door open button (not shown) installed on the door is manipulated, the actuator 16 may operate and thus the door handle assembly 10 may be operated. When the actuator 16 operates, the rod 16*a* may protrude from the actuator 16 (see arrow ① of FIG. 7) and may rotate the operating link 17 in a clockwise direction (see arrow ② of FIG. 7). In other words, when the rod 16*a* protrudes and presses the input portion 17*b* of the operating link 17, the operating portion 17*c* may move the operating protrusion 14*a* upward while an upper portion of the operating link 17 may be rotated around the rotation shaft 17*a*.

When the operating protrusion 14*a* is moved up, the handle cover 12 may be accommodated inside the housing 11 from the opening 11*a* while the first rotation link 14 is rotated in a counterclockwise direction around the first link shaft S1. In addition, the second rotation link 15 may be also rotated in the counterclockwise direction around the second link shaft S2. In this case, since the second link shaft S2 is positioned directly above the first link shaft S1 and the fourth link shaft S4 is positioned directly above the third link shaft S3, the handle cover 12 may be directly accommodated inside the housing 11 without being rotated.

Figure 11:
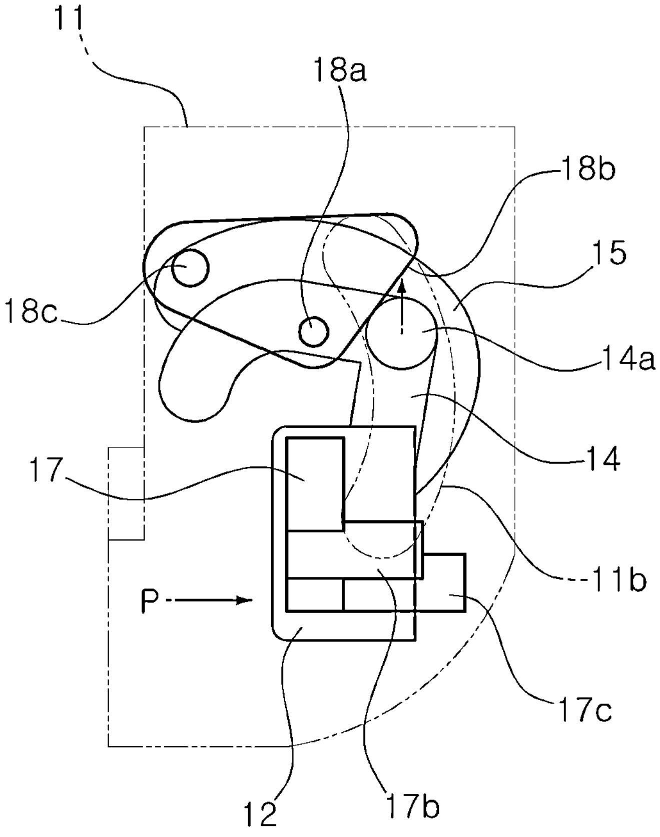
FIG. 11 is a side view illustrating a state in which an operating protrusion of a first rotation link comes into contact with a release link in the horizontal storage type auto flush door handle assembly according to an embodiment of the present disclosure.

As shown in FIG. 11, a guide slot 11*b* through which the operating protrusion 14*a* passes may be formed on a side surface of the housing 11 along a trajectory of the operating protrusion 14*a*. When the operating protrusion 14*a* is moved up due to the rotation of the first rotation link 14, the operating protrusion 14*a* may be moved along the guide slot 11*b*.

Meanwhile, when the operating protrusion 14*a* is moved up, the operating protrusion 14*a* may rotate the release link 18 so that the release link 18 releases the door latch.

When the handle cover 12 is accommodated, the user may press the release switch 13 through the opening 11*a* to open the door.

In this way, in the steady state, the actuator 16 may rotate the first rotation link 14 through the operating link 17, and the handle cover 12 may be accommodated while the first rotation link 14 is rotated.

Meanwhile, when the actuator 16 does not operate in an emergency such as a vehicle collision or in the event that the battery is discharged, the user may press the handle cover 12 to operate the door handle assembly 10, thereby opening the door. In this case, since the actuator 16 does not operate, the rod 16*a* may not extend, and the operating link 17 may be also not operated.

Figure 10:
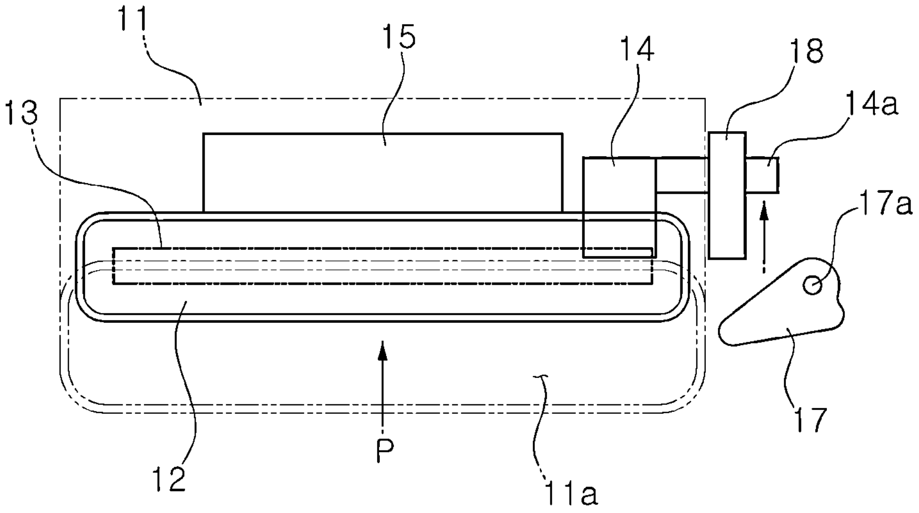
FIG. 10 is a front view illustrating a state in which the handle cover is accommodated in an emergency operation in the horizontal storage type auto flush door handle assembly according to the present disclosure.

As shown in FIGS. 10 and 11, when the user presses the handle cover 12 (see arrow P), the handle cover 12 may rotate first rotation link 14 in the counterclockwise direction around the first link shaft S1, and thus the handle cover 12 may be separated from the opening 11*a* to be accommodated in the housing 11.

In other words, because the trajectory of the handle cover 12 is determined by the first rotation link 14 and the second rotation link 15, the handle cover 12 may be accommodated inside the housing 11 according to the determined trajectory while maintaining a horizontal state.

While the handle cover 12 is accommodated inside the housing 11, the handle cover 12 may rotate the first rotation link 14 and the second rotation link 15. When the first rotation link 14 is rotated, the operating protrusion 14*a* may rotate the release link 18 while being moved upward.

Figure 12:
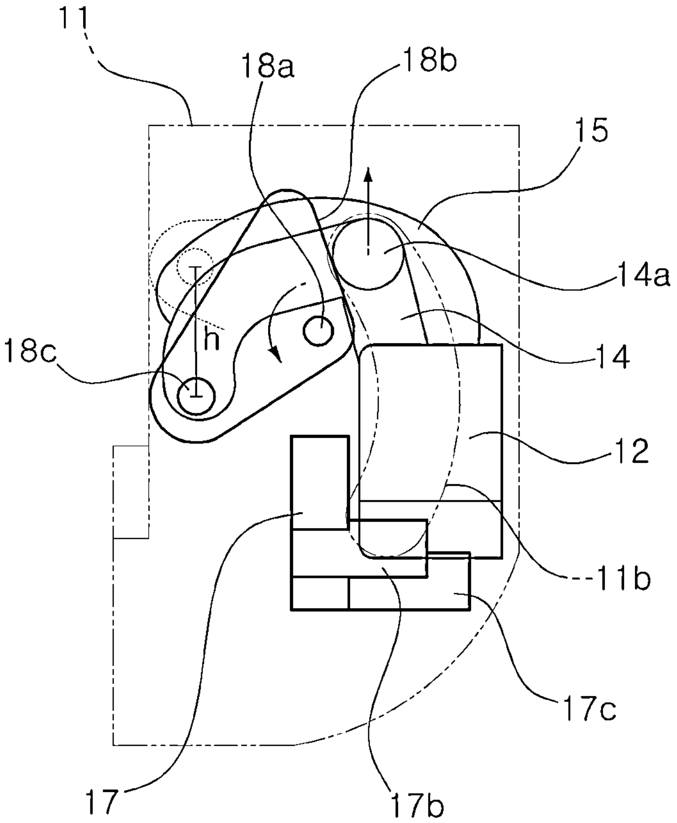
FIG. 12 is a side view illustrating a state in which the operating protrusion of the first rotation link operates a release link in the horizontal storage type auto flush door handle assembly according to an embodiment of the present disclosure.

When the release link 18 is rotated, the latch connecting hole 18*c* of the release link 18 may be moved down (see h of FIG. 12) so that the door latch is released. Thereafter, the user may manipulate the release switch 13 to open the door.

In accordance with a horizontal storage type auto flush door handle assembly of the present disclosure, which has the above-described configuration, an operating method of a door handle may be easily recognized from the outside even in an emergency or when a battery is discharged so that a door can be quickly opened.

In addition, since an auto flush type door handle may be implemented in a simple structure, the number of required parts and a production cost may be reduced.

While the embodiments of the present disclosure have been described, those having ordinary skill in the art can understand that the present disclosure can be implemented in other specific forms without departing from the technical spirit or the necessary features of the present disclosure. Therefore, it should be understood that the above-described embodiments are not restrictive but illustrative in all aspects.

What is claimed is:

1. An auto flush door handle assembly for a vehicle, the auto flush door handle assembly comprising:

a housing with an opening formed on one side thereof;

a handle cover disposed inside the housing and configured to open and close the opening;

a first rotation link including: an upper end link-connected to the housing, and a lower end link-connected to the handle cover;

a second rotation link positioned apart from the first rotation link and including: an upper end link-connected to the housing, and a lower end link-connected to the handle cover; and a release link operated by the first rotation link and configured to release a door latch, wherein the second rotation link is link-connected to the housing and the handle cover at a position being higher than the first rotation link by a predetermined height.

2. The auto flush door handle assembly of claim 1, wherein an operating protrusion, which is moved up due to a rotation of the first rotation link and operates the release link while being moved up, is formed on one side of the first rotation link.

3. The auto flush door handle assembly of claim 2, wherein:

the release link is rotatably installed on one side of the housing and including a contact surface and a latch connecting hole;

when the operating protrusion is moved up, the contact surface is in contact with the operating protrusion;

the latch connecting hole is connected to the door latch; and when the operating protrusion being moved up pushes the contact surface to rotate the release link, the door latch is released.

4. The auto flush door handle assembly of claim 2, wherein a guide slot through which the operating protrusion passes is formed on a side surface of the housing along a trajectory of the operating protrusion.

5. The auto flush door handle assembly of claim 1, further comprising:

a second link shaft configured to link-connect an upper end of the second rotation link to the housing, wherein the second link shaft is positioned directly above a first link shaft configured to link-connect an upper end of the first rotation link to the housing; and a fourth link shaft configured to link-connect a lower end of the second rotation link to the handle cover, wherein the fourth link shaft is positioned directly above a third link shaft configured to link-connect a lower end of the first rotation link to the handle cover.

6. The auto flush door handle assembly of claim 5, wherein, when the first rotation link and the second rotation link are rotated, the handle cover maintains a state in which the fourth link shaft is positioned directly above the third link shaft.

7. The auto flush door handle assembly of claim 5, wherein, when the handle cover closes the opening, the third link shaft and the fourth link shaft are positioned on an outer side of the vehicle than the first link shaft and the second link shaft.

8. The auto flush door handle assembly of claim 2, further comprising:

an actuator configured to operate the first rotation link.

9. The auto flush door handle assembly of claim 8, further comprising:

an operating link rotated by the actuator to rotate the first rotation link between the actuator and the first rotation link.

10. The auto flush door handle assembly of claim 9, wherein, when the operating link is operated by the actuator, the operating protrusion is moved up.

11. The auto flush door handle assembly of claim 10, wherein:

a rod is installed on the actuator to be movable in a straight line; and when the rod extends and rotates the operating link, the operating link moves the operating protrusion upward, and the operating protrusion rotates the release link.

12. The auto flush door handle assembly of claim 11, wherein an input portion in contact with the rod is formed at a lower end of the operating link, and an operating portion configured to rotate the operating protrusion is formed at an upper end of the operating link.

13. The auto flush door handle assembly of claim 1, wherein the first rotation link and the second rotation link are formed to be concave inward the vehicle.

14. The auto flush door handle assembly of claim 1, further comprising a release switch configured to be manipulated by a user to open a door when the handle cover is accommodated inside the housing.

15. An auto flush door handle assembly for a vehicle, comprising:

a housing with an opening formed on one side thereof;

a handle cover disposed inside the housing and configured to open and close the opening;

a first rotation link including an upper end link-connected to the housing and a lower end link-connected to the handle cover;

a second rotation link positioned apart from the first rotation link and including an upper end link-connected to the housing and a lower end link-connected to the handle cover;

an actuator configured to operate the first rotation link; and a release link rotatably installed on one side of the housing and configured to be operated by the first rotation link to release a door latch, wherein the second rotation link is link-connected to the housing and the handle cover at a position being higher than the first rotation link by a predetermined height.

16. The auto flush door handle assembly of claim 15, further comprising:

an operating link rotated by the actuator to rotate the first rotation link between the actuator and the first rotation link.

17. The auto flush door handle assembly of claim 16, wherein an operating protrusion is formed on one side of the first rotation link, and the operating protrusion is configured to move up according to a rotation of the first rotation link and configured to operate the release link while being moved up.

18. The auto flush door handle assembly of claim 17, wherein a rod is installed on the actuator to be movable in a straight line; and when the rod extends and rotates the operating link, the operating link is configured to move the operating protrusion upward, and the operating protrusion rotates the release link.

19. The auto flush door handle assembly of claim 18, wherein a guide slot through which the operating protrusion passes is formed on a side surface of the housing along a trajectory of the operating protrusion.

* * * * *